May 12, 1970  E. A. WHEELOCK  3,511,512
LIP SEAL FOR LIGHT LUBRICANTS
Filed Jan. 5, 1968
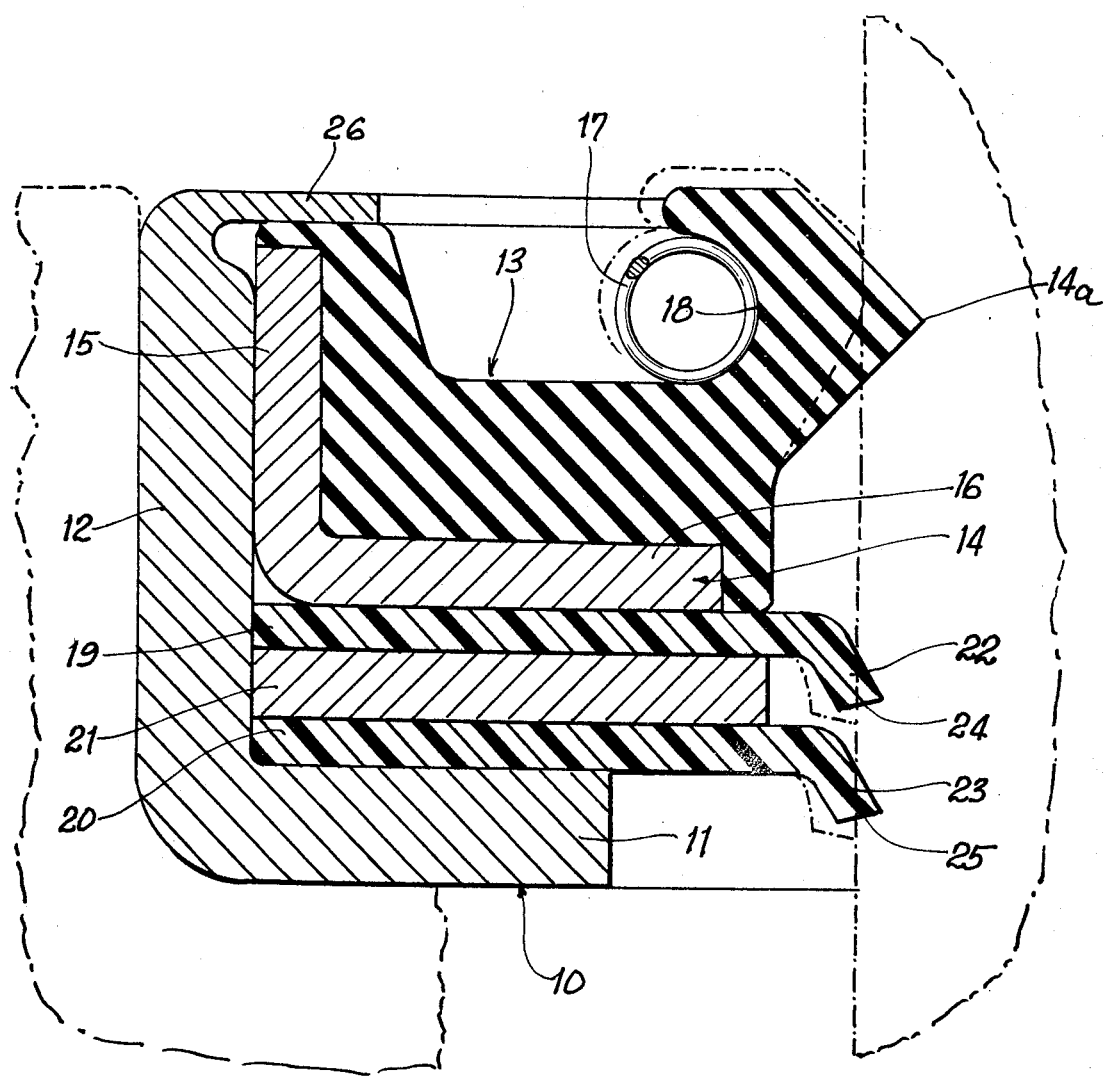
INVENTOR
Edward A. Wheelock
Charles F. Vojtech
Atty

United States Patent Office 3,511,512
Patented May 12, 1970

3,511,512
LIP SEAL FOR LIGHT LUBRICANTS
Edward A. Wheelock, Lake Zurich, Ill., assignor to Crane Packing Company, Morton Grove, Ill., a corporation of Illinois
Filed Jan. 5, 1968, Ser. No. 696,072
Int. Cl. F16j *15/00*
U.S. Cl. 277—47           1 Claim

ABSTRACT OF THE DISCLOSURE

An oil seal for preventing leakage of light oil along a shaft such as a helicopter rotor shaft, which shaft is exposed to deposits of fine abrasive particles found in the atmosphere of tropical regions, wherein a garter spring-held ring of fluoro-elastomeric material is used adjacent the oil, said ring being protected from the atmosphere by one or more die-formed rings of polytetrafluoroethylene having an outwardly turned lip contacting the shaft. All rings are permanently assembled in a single housing.

---

This invention relates to rotary mechanical oil seals of the lip type for sealing relatively light lubricants.

Oil seals for lubricants are required to hold a lubricant in a bearing and seal out harmful substances such as water, contaminants, abrasives and the like. The simplest form of oil seal is an elastomeric ring in the form of a lip which is held by a garter spring in contact with a shaft adjacent the bearing to be sealed. Where light oils are to be sealed, such as are used in the bearings for the individual blades of a helicopter or in the bearing for the main rotor shaft thereof, it has been found that the usual elastomers used for this lubricant are not very effective. Furthermore, where such lip seals are used in certain tropical atmospheres, their life is very short, being in the neighborhood of fifty hours, which is approximately one-tenth of the acceptacle life for such seals.

The use of leather or rubber washers next to lip seals to protect the lip seals from abrasive or other harmful substances, is well known. However, under the conditions given above, the leather and rubber washers failed to seal out the abrasive substances and consequently the seal failed and leaked in a very short time.

Because of the lightness of the oil being sealed, the lip seal must be very efficient and hence any protective washers used with the seal operate under substantially unlubricated conditions.

In addition to encountering severe abrasive conditions, the lip seals used in the tropics are also subjected to fungus which attaches itself to the seal material and destroys or distorts such material, particularly if leather or the like is used.

A further complication arises from the direction of installation of the seal relative to the shaft. Where protective washers are used with lip seals, the washers should have shaft-contacting curved edges which face away from the lip. When the shaft is to be installed from the washer end of the seal, the tendency is for the washers to be deformed inward toward the lip instead of outward away from the lip which is the desirable direction for maximum exclusion of dirt and foreign substances from the lip.

The object of this invention is to provide a lip-type oil seal for sealing relatively light lubricants in abrasive or humid atmospheres while providing satisfactory life for such seal. It is also an object to provide an oil seal of this type which may be installed on a shaft from either direction.

I have found that a satisfactory oil seal for humid and abrasive conditions can be had by the use of specially prepared materials for the lip and protective washers of the oil seal. These materials and the structure of the seal will be described in connection with the accompanying drawing of a preferred embodiment of the invention, in which the sole figure is a greatly enlarged radial cross-section through the novel seal in its uninstalled state, with its installed state shown in dot-dash outline.

Referring now to the drawing for a detailed description of the invention, the seal of this invention is comprised of a metal housing 10 which is generally L-shaped in radial cross-section to provide a radially disposed flat wall 11 and a cylindrical outer shell 12 which is adapted to be pressed into a cup-shaped recess in a frame or the like. At one end and within shell 12 is disposed a lip seal 13 having a circular V-shaped lip 14a adapted to be expanded over the shaft to be sealed. A metal reinforcement 14 is molded into lip seal 13, said reinforcement being L-shaped in radial cross-section and having an outer cylindrical part 15 pressed into cylindrical shell 12, and a radially disposed flat wall 16 which is axially spaced from the corresponding part 11 of housing 10. A garter spring 17 disposed in the customary groove 18, in lip 14, serves to contract and hold said lip against the shaft to be sealed. It is contemplated that lip 14a will be adjacent the oil to be sealed.

In the space between the walls 11 and 16 are disposed two sealing washers 19 and 20 separated by a flat metal washer 21. Said sealing washers 19 and 20 may be identical in composition and shape and are provided with outwardly turned lips 22 and 23, respectively, which have an uninstalled internal diameter slightly smaller than the diameter of the shaft to be sealed so that the lips are expanded in the installed state and are held in contact with the shaft by the resilience of the material of which they are composed. An inwardly rolled flange 26 on shell 12 serves to hold all of the parts of the seal in fluid-tight assembled relation in housing 10.

It may be observed that the outer surfaces 24 and 25 of lips 22 and 23 in the installed state are slightly inwardly angled so that the lips act as scrapers during axial run-out of the shaft. Ths action helps to keep abrasive particles away from lip 14.

The lubricant sealed is thin and has a tendency to pass through the smallest of openings so that relatively large radial pressure is normally required to hold the lubricant. I have found, however, that if the lip seal 13 is made from a fluoroelastomer sold commercially under the trade name "Viton," that it can effectively seal the thin lubricant without the use of excessive radial pressure. Furthermore, if the fluoroelastomer is filled with powdered carbon in an amount up to approximately twenty parts per hundred by weight, the carbon will act as an anti-friction material and will permit the use of the requisite radial pressure for effective sealing without creating undue friction. The carbon, in effect, performs the lubricating function eliminated by sealing out the light oil which would normally leak under the seal.

The washers 19 and 20 are so formed that lips 22 and 23 will be turned outward, regardless of the direction in which the seal is installed over a shaft. Since these lips must be resilient, resistant to atmospheric conditions and fungus, and must retain their shape even without the aid of a shaft. I have found that making washers 19 and 20 out of polytetrafluoroethylene, which has been molded to form the lips 22 and 23 in the free state of the washers, provides the most satisfactory life. The preformed lips hold their shape so that they may be forced over a shaft from either direction. Although polytetrafluoroethylene is naturally a low-friction material, I have found it desirable to add molybdenum disulphide to the material before it is molded to decrease still further the friction properties of the lips and to provide inherent lubrication for the lips in the absence of any oil leakage from lip 14.

The above-described material of washers 19 and 20 has enough resilience to exert a radial pressure upon a shaft over which the lips are stretched. The resilience is, of course, a function of the thickness of the material and a balance must be struck between acceptable resilience and acceptable stiffness to withstand insertion of the shaft from the direction in which the lips are inclined.

A seal made in accordance with this invention has been installed in a helicopter rotor and has successfully withstood the desirable test of 500 hours operation under tropical conditions of fungus-producing humidity and the abrasive particles produced in the drier tropical season.

I claim:

1. An oil seal for a rotatable shaft, said seal comprising a housing, an elastomeric ring in said housing adjacent the oil and having an axially extending lip contacing said shaft, a washer of polytetrafluoroethylene in the housing axially spaced from the lip, said washer having a stiff preformed axially extending lip in contact with the shaft, said preformed lip extending away from the lip on the elastomeric ring, and means for clamping said ring and washer to the housing, said elastomeric ring being comprised of a fluorelastomer sold under the brand name of "Viton" to which has been added approximately twenty parts per hundred by weight of powdered carbon, said seal comprising further a rigid ring interposed between the elastomeric ring and the washer, a second washer of polytetrafluorethylene in said housing of substantially the same size and configuration as the first-mentioned washer, said second washer being axially spaced from the first, said polytetrafluoroethylene being filled with molybdenum disulphide, and a rigid spacer-washer disposed between the two polytetrafluoroethylene washers.

References Cited

UNITED STATES PATENTS

| 2,307,152 | 1/1943 | Murray | 277—47 X |
|---|---|---|---|
| 2,644,804 | 7/1953 | Rubin | 277—237 X |
| 2,819,106 | 1/1958 | Voorhees | 277—37 X |
| 2,824,060 | 2/1958 | White | 260—900 X |
| 2,867,457 | 1/1959 | Reising et al. | 277—153 |
| 2,966,376 | 12/1960 | Reynolds | 277—153 X |
| 2,973,978 | 3/1961 | Oppenheim | 277—237 X |
| 3,099,454 | 7/1963 | Walinski | 277—47 |
| 3,147,981 | 9/1964 | Woerheide | 277—47 X |
| 3,207,521 | 9/1965 | Dega | 277—58 X |
| 3,291,864 | 12/1966 | Eldridge et al. | 260—900 |
| 3,254,898 | 6/1966 | Herbenar et al. | 277—47 |
| 3,314,916 | 4/1967 | Cupery | 260—900 X |

JAMES KEE CHI, Primary Examiner

U.S. Cl. X.R.

277—58, 153, 237